(12) United States Patent
Shih

(10) Patent No.: US 10,168,016 B1
(45) Date of Patent: Jan. 1, 2019

(54) TRANSPARENT VEHICLE LAMP

(71) Applicant: T.Y.C. BROTHER INDUSTRIAL CO., LTD., Tainan (TW)

(72) Inventor: Ming-Chih Shih, Tainan (TW)

(73) Assignee: T.Y.C. BROTHER INDUSTRIAL CO., LTD., Tainan (TW)

( * ) Notice: Subject to any disclaimer, the term of this patent is extended or adjusted under 35 U.S.C. 154(b) by 0 days.

(21) Appl. No.: 15/867,868

(22) Filed: Jan. 11, 2018

(51) Int. Cl.
*B60Q 1/00* (2006.01)
*F21S 43/20* (2018.01)
*F21S 43/31* (2018.01)
*B60Q 1/44* (2006.01)
*B60Q 1/34* (2006.01)

(52) U.S. Cl.
CPC ............... *F21S 43/26* (2018.01); *F21S 43/31* (2018.01); *B60Q 1/34* (2013.01); *B60Q 1/44* (2013.01)

(58) Field of Classification Search
CPC .......... F21S 43/26; F21S 43/31; F21S 43/315; F21S 8/00; B60Q 1/34; B60Q 1/0011; B60Q 1/28; B60Q 1/30
See application file for complete search history.

(56) References Cited

U.S. PATENT DOCUMENTS

| | | | | |
|---|---|---|---|---|
| 4,715,700 A * | 12/1987 | Daniel | ................. | G02B 6/001 359/503 |
| 5,347,435 A * | 9/1994 | Smith | ................. | B60Q 1/302 362/503 |
| 6,674,096 B2 * | 1/2004 | Sommers | ................. | H01L 33/54 257/100 |
| 7,083,313 B2 * | 8/2006 | Smith | ................. | F21S 48/328 362/327 |
| 7,349,163 B2 * | 3/2008 | Angelini | ................. | F21V 3/04 359/708 |
| 8,016,451 B2 * | 9/2011 | Householder | ........... | F21L 4/027 362/188 |
| 9,766,393 B2 * | 9/2017 | Cabanne | ............. | G02B 6/0055 |
| 2009/0296407 A1 * | 12/2009 | Bailey | ................. | F21V 5/04 362/309 |
| 2013/0201709 A1 * | 8/2013 | Natsume | ................. | B60Q 1/00 362/511 |
| 2014/0204600 A1 * | 7/2014 | Bungenstock | ....... | G02B 6/0018 362/511 |
| 2018/0119919 A1 * | 5/2018 | Baker | ................. | G02B 6/3608 |

* cited by examiner

*Primary Examiner* — Anabel Ton
(74) *Attorney, Agent, or Firm* — Burris Law, PLLC

(57) ABSTRACT

A transparent vehicle lamp includes at least one lens having a main body portion and a first light input portion. An optical axis extends through the main body portion in a front-rear direction. The main body portion has a reflecting surface intersecting with the optical axis, a coupling surface connected to a periphery of the reflecting surface and a light output surface spaced apart from the reflecting surface and the coupling surface along the optical axis such that the image of a scenery toward which the coupling surface faces is formed on the light output surface.

10 Claims, 6 Drawing Sheets

TRANSPARENT VEHICLE LAMP

FIELD

The disclosure relates to a vehicle lamp, and more particularly to a transparent vehicle lamp that is adapted to be a turn signal or a brake light.

BACKGROUND

A conventional vehicle lamp includes a light emitting member, a lens adapted for transmitting light that is emitted from the light emitting member, and a shell. The lens has a light incident surface adapted for allowing a light beam to propagate therethrough, a light output surface adapted for allowing the light beam to be output therefrom, a back-spaced apart from the light output surface, and a reflecting surface adapted for reflecting the light beam incident from the light incident surface toward the light output surface. The shell is disposed for receiving the lens, and fully covers the back of the lens. The conventional vehicle lamp is usually disposed for lighting, direction indicating and brake warning. However, the conventional vehicle lamp has simple function and dull appearance, so that the structure of the conventional vehicle lamp is required to be innovated to increase the uniqueness and the value of the products.

SUMMARY

Therefore, the object of the disclosure is to provide a transparent vehicle lamp that can alleviate at least one of the drawbacks of the prior art.

According to the disclosure, the transparent vehicle lamp includes at least one lens and a first light emitting member. The at least one lens has a main body portion and a first light input portion. An optical axis extends through the main body portion in a front-rear direction. The first light input portion is connected to one of two opposite sides of the main body portion, and is spaced apart from the optical axis. The main body portion has a reflecting surface intersecting with the optical axis, a coupling surface connected to a periphery of the reflecting surface, and a light output surface spaced apart from the reflecting surface and the coupling surface along the optical axis such that the image of a scenery toward which the coupling surface faces is formed on the light output surface. The first light input portion has a first light input surface. The first light emitting member emits light toward the first light input surface. A first light beam emitted from the first light emitting member firstly propagates toward the optical axis through the first light input surface, and is then reflected by the reflecting surface toward the light output surface.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
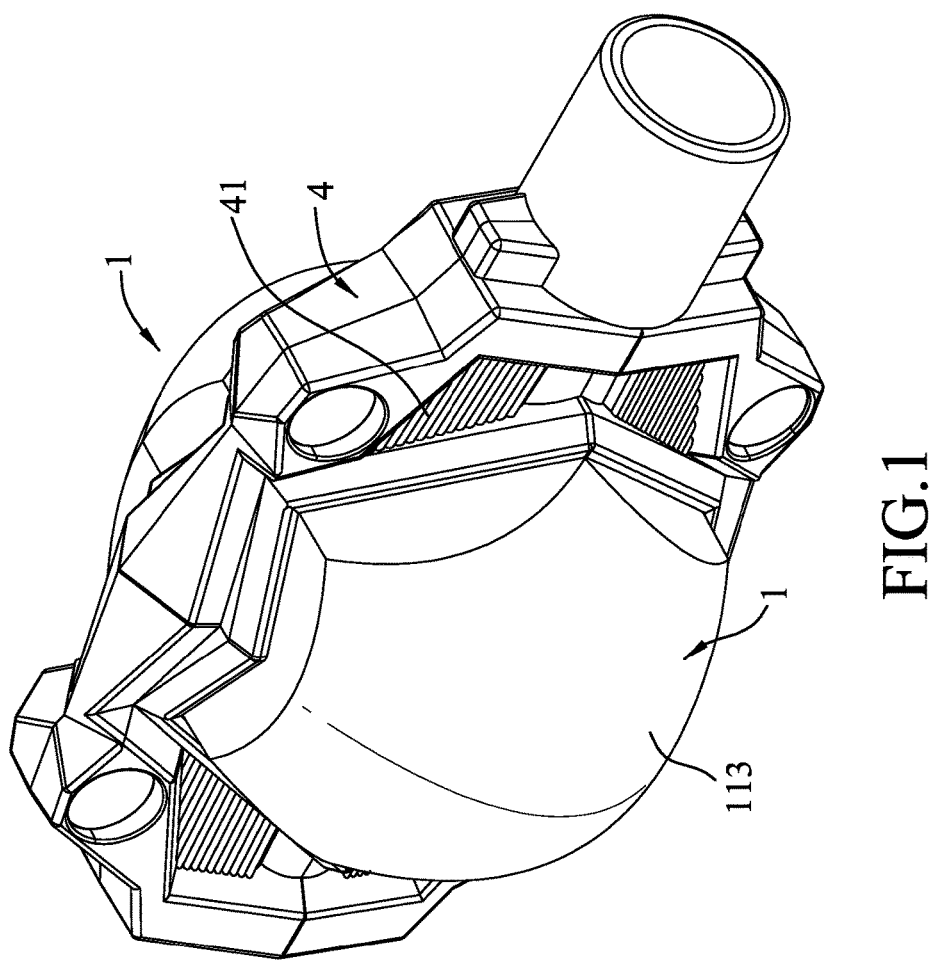
FIG. 1 is a front perspective view of an embodiment of a transparent vehicle lamp according to the disclosure.
Figure 2:
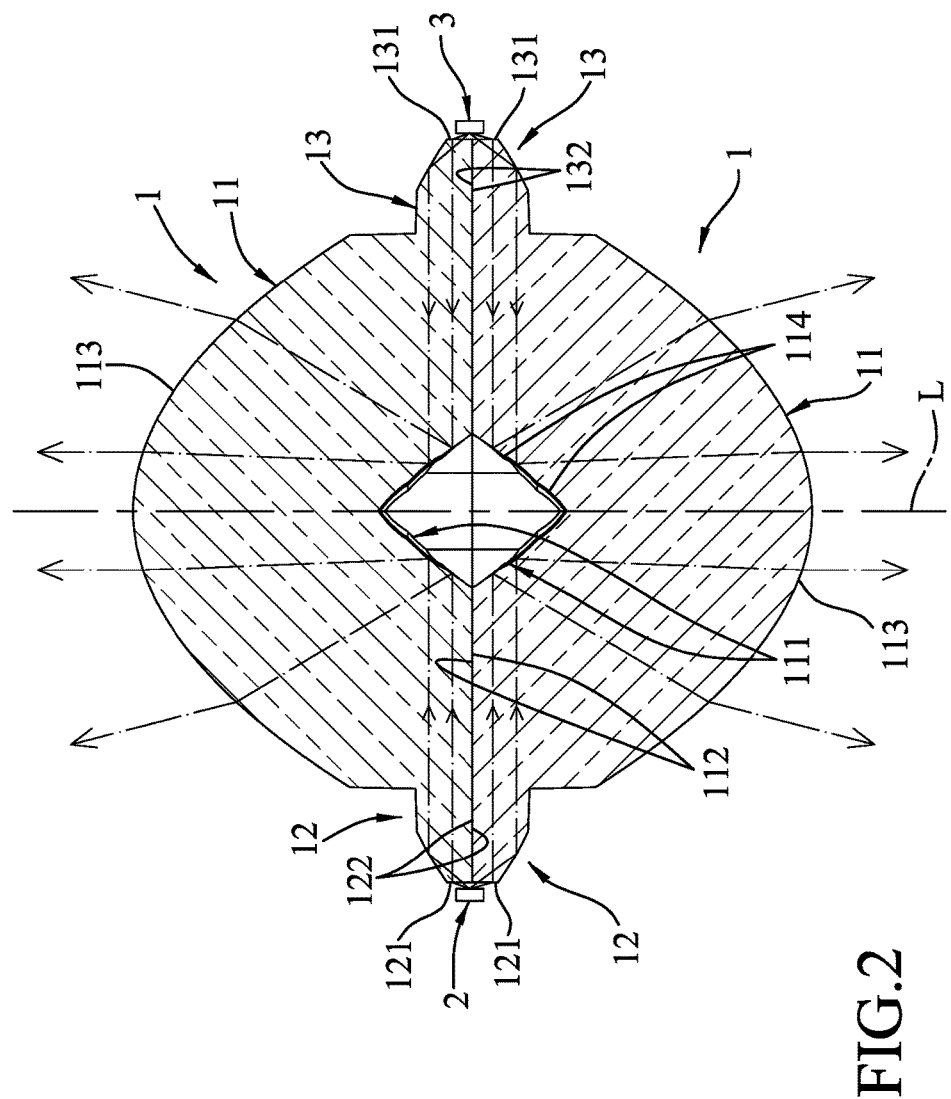
FIG. 2 is a fragmentary top sectional view of the embodiment.

Referring to FIGS. 1 and 2, the embodiment of a transparent vehicle lamp according to the disclosure is adapted to be a turn signal or a brake light. The transparent vehicle lamp includes two lenses 1 fixedly connected to each other, a first light emitting member 2, a second light emitting member 3 and a shell 4. An optical axis (L) extends through the lenses 1 in a front-rear direction. The lenses 1 are arranged along the optical axis (L).

Figure 3:
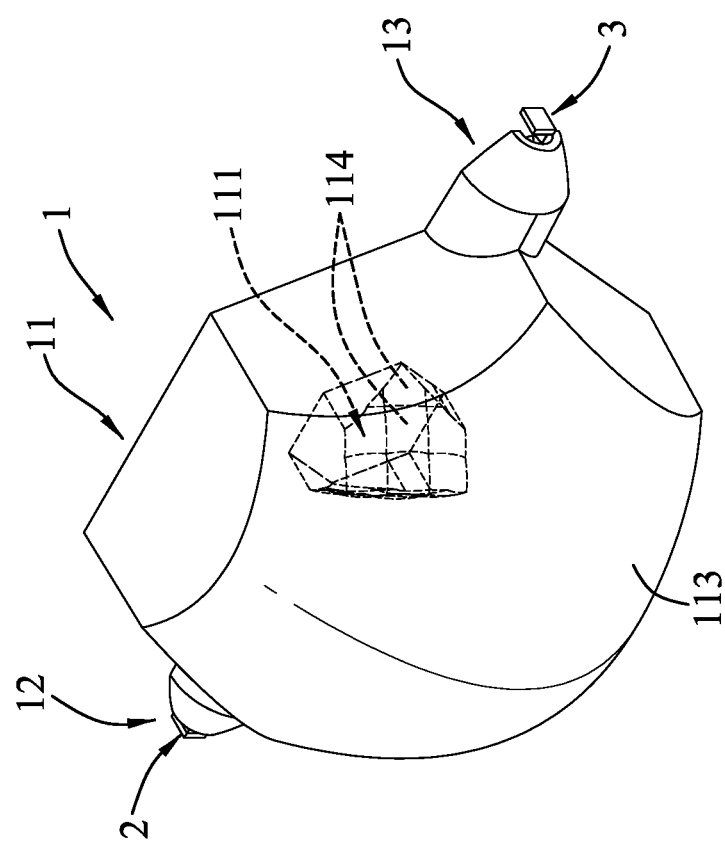
FIG. 3 is a front perspective view of one of lenses of the embodiment.
Figure 4:
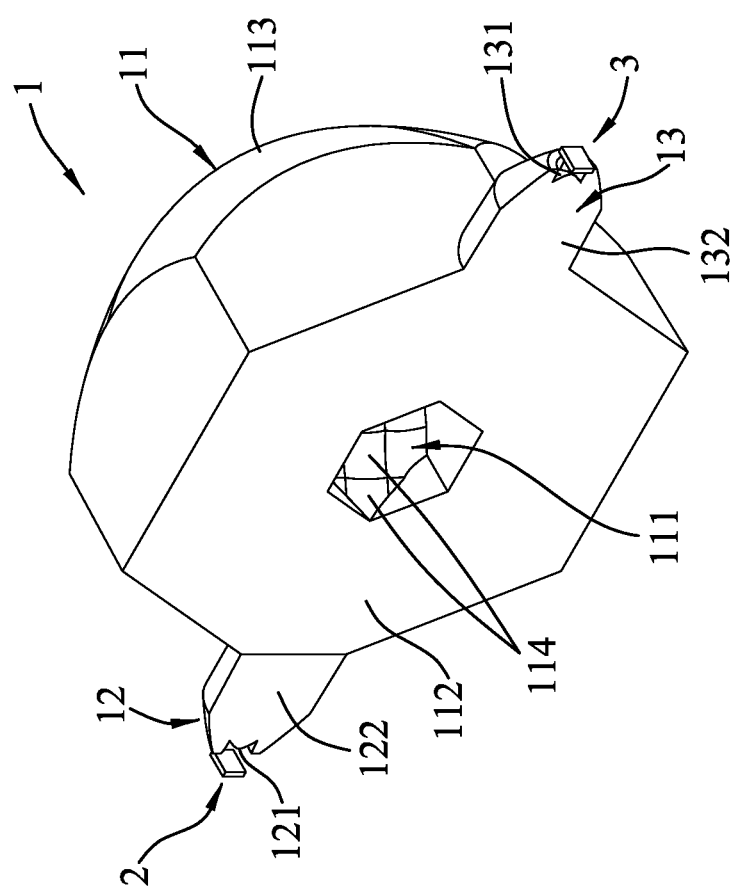
FIG. 4 is a front perspective view of the other one of lenses of the embodiment.

Referring to FIGS. 2 to 4, each of the lenses 1 has a main body portion 11, a first light input portion 12 and a second light input portion 13. The first and second light input portions 12, 13 are spaced apart from the optical axis (L), and are respectively connected to two opposite sides of the main body portion 11.

The main body portion 11 has a reflecting surface 111 intersecting with the optical axis (L), a coupling surface 112 connected to a periphery of the reflecting surface 111, and a light output surface 113 spaced apart from the reflecting surface 111 and the coupling surface 112 along the optical axis L such that the image of a scenery toward which the coupling surface 112 faces is formed on the light output surface 113. The reflecting surface 111 has a plurality of curved reflecting surface parts 114 protruding toward the light output surface 113, and adapted for uniforming light. The coupling surface 112 is a flat surface such that, the coupling surfaces 112 of the lenses 1 can be smoothly coupled together. In this embodiment, the coupling surfaces 112 of the lenses 1 abut against each other, and the light output surfaces 113 of the lenses 1 face away from each other. As such, one of the light output surfaces 113 which is disposed in front of the other one of the light output surfaces 113 faces forwardly, and the other one of the light output surfaces 113 faces rearwardly.

The first light input portion 12 has a first light input surface 121 disposed at one of the two opposite sides of the lens 1, and a first connecting surface 122 connected between the coupling surface 112 and the first light input surface 121. The second light input portion 13 has a second light input surface 131 disposed at the other one of the two opposite sides of the lens 1, and spaced apart from the first light input surface 121, and a second connecting surface 132 connected between the coupling surface 112 and the second light input surface 131. The coupling surface 112 cooperates with the first connecting surface 122 and the second connecting surface 132 to form a continuous flat surface. In such manner, the continuous flat surface of one of the lenses 1 can abut against the continuous flat surface of the other one of the lenses 1 so as to fittingly couple the lenses 1 together. In this embodiment, the first light input portion 12 and the second light input portion 13 are not located on the optical axis (L), and are symmetrically disposed about the optical axis (L). In other embodiments, the first and second light input portions 12, 13 may be arranged in other manners. It should be noted that, in other embodiments, the number of the light input portions 12, 13 may be varied, for example, each of the lenses 1 may be provided with only one light input portion. The first light emitting member 2 is disposed on one side of the first light input portion 12, and emits light toward the first light input surface 121. The second light emitting member 3 is disposed on one side of the second light input portion 13, and emits light toward the second light input surface 131. In this embodiment, each of the first and the second light emitting members 2, 3 is configured as a light emitting diode (LED), and the configurations of the first and second light emitting members 2, 3 may be varied in other embodiments.

Figure 5:
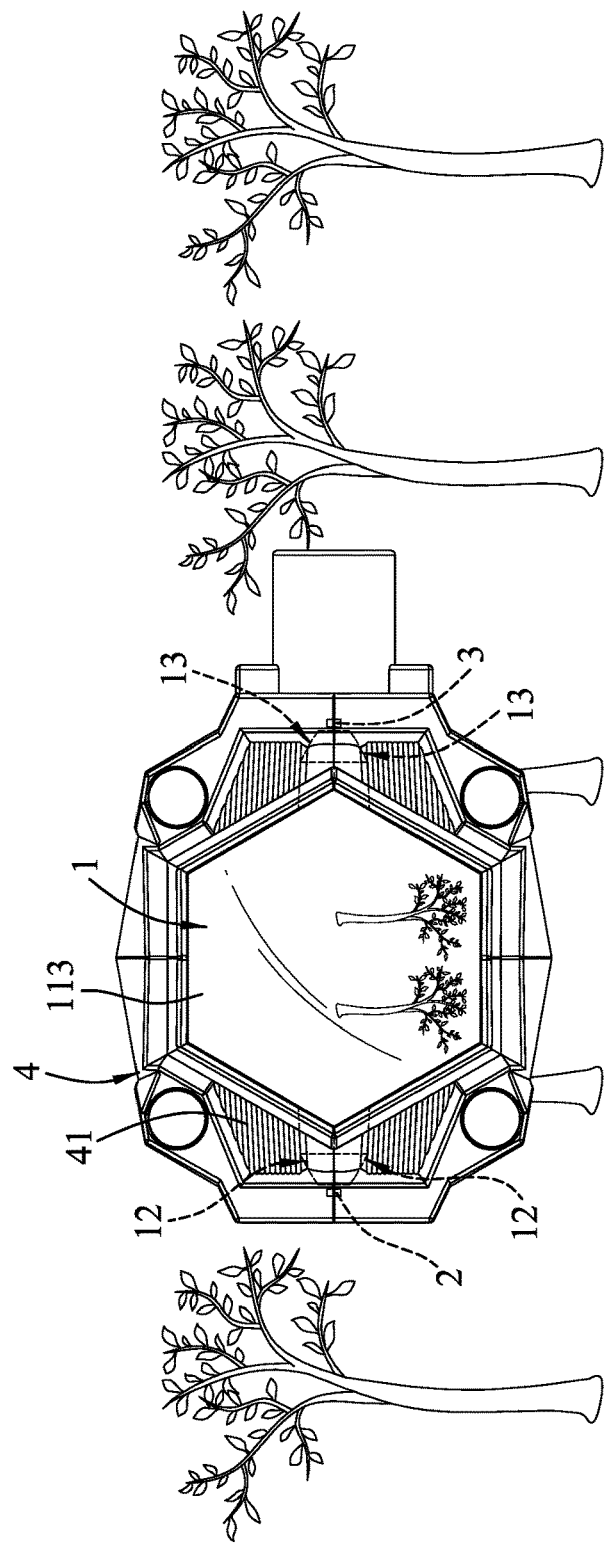
FIG. 5 is a front schematic view of the embodiment, illustrating that an inverted image of scenery which is disposed behind the embodiment can be observed from a light output surface of the embodiment.

Referring to FIGS. 2, 3 and 5, the shell 4 receives the lenses 1, and is adapted to be mounted to a vehicle (not shown). The shell 4 has a surrounding portion 41 fully covering the first light input portions 12, the second light input portions 13, the first light emitting members 2 and the second light emitting embers 3. In such manner, only the main body portions 11 of the lenses 1 are visible from both front and the rear (i.e., the remaining portions of the lenses 1 are not visible), and the appearance of the transparent vehicle lamp is simple and neat.

First light beams emitted from the first light emitting members 2 respectively and firstly propagate toward the optical axis (L) through the first light input surfaces 121 of the lenses 1, and are then respectively reflected by the reflecting surfaces 111 of the lenses 1 toward the light output surfaces 113 of the lenses 1. Similarly, second light beams emitted from the second light emitting members 3 respectively and firstly propagate toward the optical axis (L) through the second light input surfaces 131 of the lenses 1, and are then respectively reflected by the reflecting surfaces 111 toward the light output surfaces 113. It should be noted that, the transparent vehicle lamp is designed according to the Total Internal Reflection (TIR) theory, so that the reflecting surfaces 113 can totally reflect most of the light beams at a specific incident angle. In such manner, the light beams can be effectively utilized, and the shape and the brightness of the projected area are satisfied to the regulation requirements. In addition, the reflecting surface parts 114 of the reflecting surface 111 of each of the lenses 1 form a diffusion structure so as to improve the diffusing effectiveness and the uniform effectiveness of the light beams.

It should be noted that, in this embodiment, since the lenses 1 are arranged along the optical axis (L) and the light output surfaces 113 of the lenses 1 respectively face forwardly and rearwardly, the light beams emit from both front and rear sides of the transparent vehicle lamp. As a result, the vehicle can indicate signals forwardly and rearwardly, and the convenience of the indicating operation is improved. In addition, the first and second light beams emitted from the first emitting member 2 and the second emitting member 3 can both be transmitted through the lenses 1, so that the cost of mounting the emitting members is decreased. The transparent vehicle lamp may be applied to a motorcycle and other types of vehicles.

When the first and second light beams are not emitted from the first and second light emitting members 2, 3, the image of the scenery which is located at a rear side of the transparent vehicle lamp can be observed from the light output surface 113 of the front lens 1. Similarly, the image of the scenery which is located at a front side of the transparent vehicle lamp can be observed from the light output surface 113 of the rear lens 1. With such configuration, the light output area of the transparent vehicle lamp may function as a scenery image forming area, and a special visual effectiveness can be achieved.

It should be noted that, in this embodiment, each of the lenses 1 is a convex lens, and is adapted to form a real and inverted image.

Figure 6:
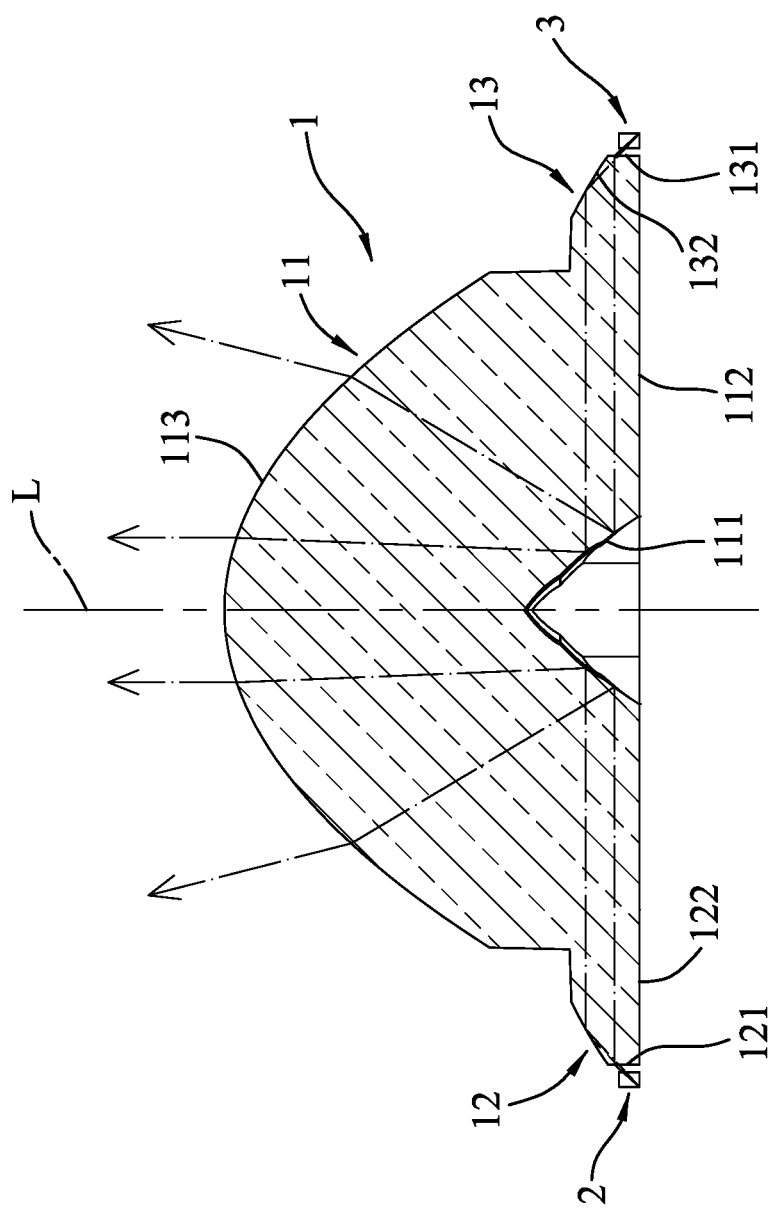
FIG. 6 is a fragmentary top sectional view of a variation of the embodiment.

As shown in FIGS. 1 and 6, a variation of the embodiment may include only one lens 1. The variation of the embodiment may be used as an indicating signal which projects the light beams forwardly or an indicating signal which projects the light beams rearwardly. The shell 4 may be modified to correspond to the variation of the embodiment in shape. The variation of the embodiment can also form a real and inverted image of the scenery.

In conclusion, with the configurations of the transparent vehicle lamp, the specialty and the product value of the transparent vehicle lamp are increased so as to raise the competitiveness of the product, and an increase in volume of the transparent vehicle lamp can be prevented.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A transparent vehicle lamp comprising:
at least one lens having a main body portion, an optical axis extending through said main body portion in a front-rear direction, and a first light input portion that is connected to one of two opposite sides of said main body portion, and that is spaced apart from the optical axis, said main body portion having a reflecting surface that intersects with the optical axis, a coupling surface that is connected to a periphery of said reflecting surface, and a light output surface that is spaced apart from said reflecting surface and said coupling surface along the optical axis such that the image of a scenery toward which said coupling surface faces is formed on said light output surface, said first light input portion having a first light input surface; and
a first light emitting member facing said first light input surface, a first light beam emitted from said first light emitting member firstly propagating toward the optical axis through said first light input surface, and being then reflected by said reflecting surface toward said light output surface.

2. The transparent vehicle lamp as claimed in claim 1, wherein said at least one lens is a convex lens, and is adapted to form a real and inverted image.

3. The transparent vehicle lamp as claimed in claim 1, further comprising a shell receiving said at least one lens, and having a surrounding portion that fully covers said first light input portion and said first light emitting member.

4. The transparent vehicle lamp as claimed in claim 1, wherein said coupling surface is a flat surface.

5. The transparent vehicle lamp as claimed in claim 4, wherein said first light input portion further has a first connecting surface connected between said coupling surface and said first light input surface, and cooperating with said coupling surface to form a continuous flat surface.

6. The transparent vehicle lamp as claimed in claim 1, where ins aid reflecting surface has a plurality of curved reflecting surface parts protruding toward said light output surface.

7. The transparent vehicle lamp as claimed in claim 1, wherein:
   said at least one lens further has a second light input portion connected to the other of the opposite sides of said main body portion, spaced apart from said first light input portion and the optical axis, and having a second light input surface; and
   said transparent vehicle lamp further comprising a second light emitting member, a second light beam emitted from said second light emitting member firstly propagating toward the optical axis through said second light input surface, and being then reflected by said reflecting surface toward said light output surface.

8. The transparent vehicle lamp as claimed in claim 1, comprising two said lenses fixedly connected to each other, and arranged along the optical axis, said coupling surfaces of said lenses abutting against each other, said light output surfaces of said lenses facing away from each other.

9. The transparent vehicle lamp as claimed in claim 8, wherein said coupling surfaces are flat surfaces.

10. The transparent vehicle lamp as claimed in claim 8, further comprising a shell receiving said lenses, and having a surrounding portion that fully covers said first light input portions of said lenses and said first light emitting members.

* * * * *